United States Patent [19]

Blackburn et al.

[11] 4,089,699
[45] May 16, 1978

[54] PIGMENT PREPARATION

[75] Inventors: John Bryce Blackburn, Beith, Scotland; Arnold William Field, Ruabon, Wrexham, Wales

[73] Assignee: Ciba-Geigy Corporation, Ardsley, N.Y.

[21] Appl. No.: 624,356

[22] Filed: Oct. 21, 1975

[30] Foreign Application Priority Data

Oct. 26, 1974 United Kingdom ............... 46407/74
Jul. 18, 1975 United Kingdom ............... 30160/75

[51] Int. Cl.² ............................................... C08J 3/20
[52] U.S. Cl. .......................... 106/308 Q; 106/308 M; 260/42.14; 260/42.21; 106/288 Q
[58] Field of Search .......... 106/308 Q, 308 M, 288 Q; 260/42.14, 42.21

[56] References Cited

U.S. PATENT DOCUMENTS

| 3,385,808 | 5/1968 | Wulf von Boren et al. | 106/308 Q |
| 3,449,291 | 6/1969 | Lerman et al. | 106/308 Q |
| 3,458,804 | 7/1969 | Wolf et al. | 106/308 M |
| 3,674,736 | 7/1972 | Lerman et al. | 106/308 Q |

Primary Examiner—Winston A. Douglas
Assistant Examiner—J. V. Howard
Attorney, Agent, or Firm—Vincent J. Cavalieri; Michael W. Glynn

[57] ABSTRACT

A pigment composition comprising pigment and at least 5% by weight based on the weight of composition of a complex formed from one or more non ionic polyether surfactants based on ethylene oxide and a polymeric carboxylic acid having a molecular weight of at least 1500.

10 Claims, No Drawings

PIGMENT PREPARATION

The present invention relates to a pigment composition readily dispersible in water based systems especially emulsion paints.

Water-dispersible pigments are currently available in the paste form but the use of such compositions involves handling large quantities of water, surfactants and humectant as well as pigment. Moreover, to get deeper shades in paints it is necessary to reduce the titanium dioxide content and this can affect the structure of the paint. It is therefore desirable to produce a more compact easily handled product with a higher pigment content thus giving a higher colouring power per unit weight.

It is known to add a non-ionic surfactant during pigment synthesis to produce a very fine pigment dispersion but the pigment is not isolatable. Pigment powders are known which contain about 50% pigment and 50% anionic surface-active agent but are inferior to pastes when incorporated into paints in terms of wash-resistance of paint film due to the surfactant content. Organic pigment powders cannot normally be dispersed with ease in aqueous systems such as emulsion paint, and aqueous paste dispersions are usually prepared prior to incorporation into the paint system. British Pat. No. 946,053 describes the stabilisation of an aqueous dispersion of the pigment obtained from the press cake or directly by synthesis, by heating the aqueous dispersion with a nonionic surfactant to a temperature above the surfactant cloud point, and afterwards isolating and washing with water while maintaining the temperature above the surfactant cloud point.

We have found that if a polymeric carboxylic acid or its salt is added in addition to the non-ionic surfactant at any stage during or after pigment synthesis and the pH reduced to 4 or below, it is unnecessary to heat above the cloud point of the surfactant and the pigment can be isolated without the surfactant being desorbed and can be rapidly redispersed in mildly alkaline aqueous systems by slow-speed stirring.

According to the present invention there is provided a pigment composition comprising pigment and at least 5% by weight based on the weight of composition of a complex formed from one or more non ionic polyether surfactants based on ethylene oxide and a polymeric carboxylic acid having a molecular weight of at least 1500.

The amount of complex used depends on its influence on the properties of the water based system into which the pigment composition is incorporated. For example if the amount of complex is too high there may be an adverse influence on the film forming properties of the water based system in which the pigment composition is incorporated, for example the wash-resistance may be inferior. If the amount of complex is too low inferior dispersibility in the application system will result.

Preferably the solid pigment composition comprises from 70 to 95% by weight of pigment and from 30 to 5% by weight of the complex.

The non-ionic surfactant should be soluble in alkaline conditions and have the capacity to form a precipitate with the polymeric carboxylic acid under acid conditions. Provided the above criteria are fulfilled the molecular weight may conveniently range from 350 to 8,000,000.

The non-ionic surfactant may be, for instance, poly (ethylene oxide) having an average molecular weight from about 600 to 1,000,000; a polyethyleneoxylated alkyl phenol, alcohol or carboxylic acid; an ethoxylated amine or a polyvinylether.

The non-ionic surfactant may contain anionic and cationic groups in addition to other alkoxy groups such as propoxy groups, providing the non-ionic character predominates and the surfactant retains the capacity to form a precipitate with a polycarboxylic acid. Copolymers of ethylene oxide and propylene oxide may also be used as the non-ionic surfactant in which case the molecular weight is preferably at least 600.

A particularly valuable non-ionic surfactant is ethoxylated nonyl phenol which may if desired be used as a mixture with a block copolymer of ethylene oxide and propylene oxide.

Examples of non-ionic surfactants that may be used are those sold under the Trade Marks "Lissapol NX" (a nonylphenol ethoxylate), "Supronic E 400" (an ethylene oxide/propylene oxide block copolymer), "Pluronic L64" (an ethylene oxide/propylene oxide block copolymer), "Texafor D5" and "Texafor D 20" which are modified ethylene oxide condensates and "Polychol 10".

The polymeric carboxylic acid may be a homopolymer or a copolymer. The homopolymer may be derived from an unsaturated monocarboxylic acid such as acrylic acid, methacrylic acid or crotonic acid; or from a dicarboxylic acid such as maleic acid. The copolymer may be prepared by copolymerizing one or more kinds of monomer having a carboxyl group, for example, an unsaturated monocarboxylic acid such as acrylic acid, methacrylic acid, or crotonic acid or an unsaturated polycarboxylic acid such as maleic acid, itaconic acid, aconitic acid or fumaric acid or the corresponding anhydride or a half-ester thereof with one or more kinds of vinyl monomer having no carboxyl group, for example, ethylene, propylene, diisobutylene; an acrylic acid ester such as methyl acrylate, ethyl acrylate, butyl acrylate; a methacrylic acid ester such as methyl methacrylate, ethyl methacrylate, butyl methacrylate or dodecyl methacrylate; a crotonic acid ester such as methyl crotonate, ethyl crotonate or butylcrotonate; acrylonitrile; an unsaturated acid amide such as acrylamide, methacrylamide or crotonamide; an aromatic vinyl compound such as styrene or α-methylstyrene; a vinyl halide such as vinyl chloride or vinylidene chloride; a vinyl ester such as vinyl formate, vinyl acetate, vinyl propionate, vinyl butyrate, vinyl versatate or vinyl stearate.

Examples of polymeric acids are polymaleic acid, copolymers of methacrylic acid or acrylic acid with water insoluble monomers such as dodecyl methacrylate, copolymers of ethylene and maleic anhydride or copolymers of diisobutylene and maleic anhydride. The polymeric acid is preferably polyacrylic acid or polymethacrylic acid.

The molecular weight of the polymeric carboxylic acid is preferably at least 1500 and may be as high as 2,000,000 provided that it is capable of forming a precipitate with the non-ionic surfactant under acid conditions.

Examples of polymeric carboxylic acids that may be used are those sold under the Trade Marks "Versicol S11", (a polyacrylate having an approximate molecular weight of 250,000) "Vinapol 1640" (a low molecular weight polymethacrylic acid as potassium salt solution)

and "Orotan 731" (a solution of a salt derived from maleic anhydride-di-isobutylene copolymer).

The present invention also provides a process for the production of pigment preparations which comprises treating a dispersion of a pigment with at least 5% by weight based on the weight of the pigment of a combination of a non-ionic polyether surfactant based on ethylene oxide and a polymeric carboxylic acid or its salt having a molecular weight of at least 1500, preferably at least 2000, and afterwards reducing the pH to 4 or below, whereby a complex precipitate is formed between the non-ionic surfactant and the polymeric carboxylic acid which is deposited on the pigment, and separating the pigment thus obtained.

Both the polymeric acid and non-ionic surfactant may contain other subsidiary substituents such as amino, amido or alkyl ether providing they do not interfere substantially with the reversible insolubilisation of the two components. For example, small amounts of basic groups may be present in the non-ionic surfactant and do not interfere with the process other than to bring the optimum pH for isolation of the complex near to the appropriate isoelectric point.

The non-ionic surfactant and the polymeric carboxylic acid are added to the pigment during synthesis e.g. either before, during or after coupling in the case of azo pigments or to the press cake. They may be added together or separately depending on the prevailing pH.

The equivalent ratio of ether oxygen in the non-ionic surfactant to carboxylic group in the polymeric carboxylic acid may be conveniently from 1:1 to 3:1.

The complex formed is insoluble in water at certain characteristic acid pH's, usually below 4. The variables which determine whether or not a complex is formed are:
1. Ethylene oxide content of surfactant
2. Nature of the surfactant, for example, steric and chemical properties.
3. Molecular weight of polymeric carboxylic acid.
4. Nature of the polymeric carboxylic acid.

Whether or not any combination of non-ionic surfactants and polymeric carboxylic acid can form a complex may be determined by acidifying a dilute aqueous solution of the mixture and observing whether a precipitate is formed.

The pigment compositions of the present invention are readily dispersible in water-based systems such as emulsion paints and inks and the present invention also provides a water based system containing a pigment composition as hereinbefore described.

The pigment compositions of the present invention have a higher pigment content compared with known pigment powders and greater wet-rub fastness. The presence of a surfactant during pigment synthesis leads to improved colouristic properties and the pigment compositions can be prepared in a one-stage process.

The following Examples further illustrate the present invention.

EXAMPLE 1

To a press cake containing 100g of the calcium salt of a red azo dyestuff 2-amino-4-chloro-5-methyl-benzene sulphonic acid-2-hydroxy-3-naphthoic acid are added 10g of "Lissapol NX" (a condensation product of nonylphenol and ethylene oxide) and the slurry high-speed stirred for 30 minutes to obtain a fluid mixture. This is diluted with approximately 4000ml water and 8g of "Supronic E400" (an ethylene oxide/propylene oxide block copolymer) and 5g of "Versicol S11" (a high molecular weight polyacrylate) added and the mixture slow speed stirred for 0.5hr. The pH of the system is then reduced to 2.5 with dilute hydrochloric acid, the solid filtered, washed acid free and dried at 50° C. A red pigment powder is obtained after grinding having a pigment content of 85.4% and dispersible in dilute aqueous ammonium hydroxide, water based acrylic inks and emulsion paints.

EXAMPLE 2

70g of an azo dyestuff from 2,4-dinitroaniline and 2-naphthol, 7g of "Lissapol NX" (an ethylene oxide condensate of nonylphenol), 7g of Supronic E400 (an ethylene oxide/propylene oxide block copolymer), 7.2g of a 25% w/w aqueous solution of "Orotan-731" (a carboxylated polymer) and 48g water are triple-roll milled to give a pigment paste. 85g of this paste is diluted with 1500 ml water and 2.2g of "Versicol S11" (a high molecular weight polyacrylate added). The mixture is stirred for 0.5 hr and the pH reduced to 2.0 with dilute hydrochloric acid. The solid is filtered, washed free from acid and dried at 50° C. A red solid, dispersible in aqueous alkali is obtained.

EXAMPLE 3

To 3.7g sodium hydroxide in 200 ml water is added 16.2g acetoacet-2-chloroanilide. This solution is acidified with 8g acetic acid and 5g sodium acetate, 2.4g of "Lissapol NX" (an ethylene oxide condensate of nonylphenol) and 1.8g of Pluronic L64 (an ethylene oxide/propylene oxide copolymer) are added. A diazo solution prepared from 15.9g 2-nitro-4-chloroaniline (82% pure), 16.6 ml concentrated hydrochloric acid and 5.3g sodium nitrite is run in over a period of one hour. 6g of "Vinapol 1640" (potassium salt solution of polymethacrylic acid) is added and the pH of the mixture is reduced to 2.0 with dilute hydrochloric acid, the solid filtered, washed free from salt and dried at 50° C to give a yellow pigment dispersible in dilute alkali by slow speed stirring.

EXAMPLE 4

A pigment elaboration is prepared as in Example 3 the coupling being carried out in the presence of 8% (on pure pigment weight) "Lissapol NX", 10% "Supronic E400", 3% "Orotan 731 SD", and 4% "Versicol S11" being added prior to acidification. The press cake obtained is redispersed in water and spray dried to give a pigment which is dispersible in mildly alkaline systems e.g. emulsion paints.

EXAMPLE 5

A pigment elaboration is prepared as in Example 3 the coupling being carried out in the presence of 16% (on pigment weight) of "Lissapol NX". 24% (on pigment weight) of "Vinapol 1640" is added prior to acidification to pH2.

EXAMPLE 6

A pigment elaboration is prepared as in Example 3 the coupling being carried out in the presence of 8% "Lissapol NX", 6% "Supronic E400", 3% "Orotan 731 SD" and 3.5% of a high molecular weight copolymer of dodecyl methacrylate/methacrylic acid prepared from a feed ratio of 5:95 weight/weight. Acidification is carried out without further additions.

EXAMPLE 7

100g red iron oxide, 2.5g "Supronic E400", and 100g water are high speed stirred for 0.5 hr and 14g of "Vinapol 1640" (potassium salt of polymethacrylic acid) added and the pH of the mixture reduced to 2.8 with dilute hydrochloric acid. After filtration, washing and drying, a red powder dispersible in dilute alkali by slow speed stirring is obtained.

EXAMPLE 8

3.3 parts of copper phthalocyanine crude pigment is ground with 6.2 parts sodium sulphate and 0.5 parts sodium acetate and 0.1 part diethylaniline for 12 hours then stirred 6 hours at reflux in isopropanol.

0.75 parts Lissapol NX is then added in 31 parts water solution and the isopropanol distilled off.

Thereafter, 1.4 parts Versicol E11 solution is added and the pH reduced to below 3 with 1.6 parts concentrated hydrochloric acid in 1.6 parts water.

The pigment is then isolated by filtration, washed sulphate free and dried at 50° C to yield a product easily dispersible in aqueous emulsion paints and inks.

EXAMPLES 9 – 16

The procedure in Example 4 was followed except that the "Lissapol NX" was replaced by the following:

| Example | | Non-Ionic Surfactant |
|---|---|---|
| 9 | Texafor A2 | Ethoxylated fatty alcohol |
| 10 | Texafor T30 | Ethoxylated fatty alcohol |
| 11 | Texafor T45 | Ethoxylated fatty alcohol |
| 12 | Texafor D5 | Ethoxylated glyceride oil |
| 13 | Texafor D20 | Ethoxylated glyceride oil |
| 14 | Texafor E6 | Ethoxylated saturated fatty acid |
| 15 | Texafor M2 | Ethoxylated unsaturated fatty acid |
| 16 | Polychol 10 | Ethoxylated lanolin alcohol |

The pigments were dried at 50° C and were dispersible in commercial emulsion paints.

EXAMPLE 17

A similar procedure to that described in Example 4 but using, as surfactants 1.4g "Lissapol NX"
1.5g "Versicol S11" as a 8% by weight solution in ammoniacal water and acidifying with 15 ml concentrated HCl diluted with 15 ml water.

EXAMPLE 18

A pigment elaboration was prepared as in Example 4 the coupling being carried out in the presence of 12% by weight based on the weight of pigment of "Lissapol NX" and 8% by weight based on the weight of pigment of "Orotan 731".

The pigment obtained after acidification, filtration and drying was dispersible in emulsion paints.

EXAMPLE 19

0.61 grams of a product prepared by Example 8 was added to 100 grams of commercially available white emulsion paint having a pH of 9.5 with stirring using a conventional laboratory electric stirrer at speeds of 500 revolutions per minute and above. Within 20 minutes the paint had acquired maximum colour strength indicating complete dispersion of the pigment preparation in the paint.

EXAMPLE 20

28 grams of a yellow product from Example 4 was added to a solution of 17 grams water-based varnish of the Shellac type and 55 grams water at pH 9.5. After 20 minutes stirring at 4000 revolutions per minute an acceptable ink mill base was obtained with a pigmentation level of about 24%. This was reduced to a final ink of 10% pigmentation.

EXAMPLE 21

By following a similar procedure to that described in Example 20 but using an aqueous acrylic resin dispersion instead of the Shellac, a similar result was obtained.

We claim:

1. A pigment composition comprising pigment having deposited thereon at least 5% by weight based on the weight of composition of a complex formed from one or more non ionic polyether surfactants based on ethylene oxide and a polymeric carboxylic acid having a molecular weight of at least 1500.

2. A composition as claimed in claim 1 which comprises from 70 to 95% by weight of pigment and from 30 to 5% by weight of complex, based on the weight of composition.

3. A composition as claimed in claim 1 in which the non-ionic surfactant has a molecular weight of from 350 to 8,000,000.

4. A composition as claimed in claim 3 in which the non-ionic surfactant is poly(ethylene oxide) having an average molecular weight from 600 to 1,000,000, a polyethyleneoxylated alkyl phenol, alcohol or carboxylic acid.

5. A composition as claimed in claim 3 in which the non-ionic surfactant is a copolymer of ethylene oxide and propylene oxide having a molecular weight of at least 600.

6. A composition as claimed in claim 3 in which the non-ionic surfactant is ethoxylated nonyl phenol.

7. A composition as claimed in claim 3 in which the non-ionic surfactant is a mixture of ethoxylated nonyl phenol with a block copolymer of ethylene oxide and propylene oxide.

8. A composition as claimed in claim 1 in which the polymeric carboxylic acid is polymaleic acid, a copolymer of methacrylic acid or acrylic acid with dodecyl methacrylate, a copolymer of ethylene and maleic anhydride or a copolymer of diisobutylene and maleic anhydride.

9. A composition as claimed in claim 1 in which the polymeric carboxylic acid is polyacrylic acid or polymethacrylic acid.

10. A process for the production of a pigment preparation which comprises treating a dispersion of a pigment with at least 5% by weight based on the weight of the pigment of a combination of a non-ionic polyether surfactant based on ethylene oxide and a polymeric carboxylic acid or its salt having a molecular weight of at least 1500 and afterwards reducing the pH to 4 or below, whereby a complex precipitate is formed between the non-ionic surfactant and the polymeric carboxylic acid which is deposited on the pigment, and separating the pigment thus obtained.

* * * * *